S. PIERSON.
CUTTING APPARATUS FOR MOWERS OR REAPERS.
APPLICATION FILED AUG. 11, 1908.
912,164.
Patented Feb. 9, 1909.
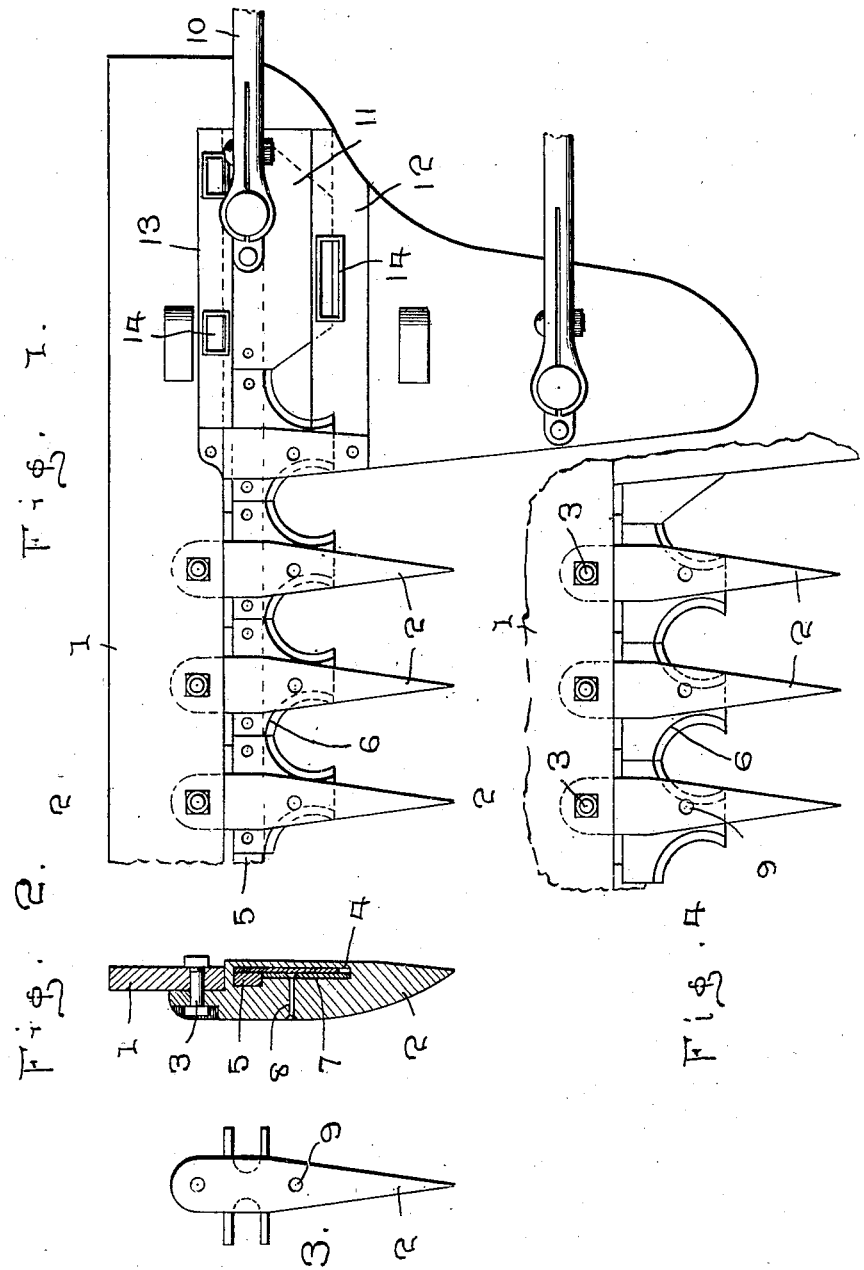

UNITED STATES PATENT OFFICE.

SAMUEL PIERSON, OF ALVA, OKLAHOMA.

CUTTING APPARATUS FOR MOWERS OR REAPERS.

No. 912,164.  Specification of Letters Patent.  Patented Feb. 9, 1909.

Application filed August 11, 1908. Serial No. 447,992.

*To all whom it may concern:*

Be it known that I, SAMUEL PIERSON, a citizen of the United States, residing at Alva, in the county of Woods and State of Oklahoma, have invented certain new and useful Improvements in Cutting Apparatus for Mowers or Reapers; and I do hereby declare the following to be a full, clear, and exact description of the invention, such as will enable others skilled in the art to which it appertains to make and use the same.

This invention relates to new and useful improvements in cutting apparatus for mowers and reapers and my object is to provide a device of this class wherein the cutting device is given such movement as to carry the cutting portions or plates of the bar entirely through the finger normally coöperating therewith and part way through the next succeeding finger, whereby the accumulation of foreign matter, caused by gum from the grass being cut, is reduced to a minimum or entirely obviated.

A further object is to provide means for holding a soluble lubricant whereby the moving parts of the cutting device will be thoroughly lubricated and a still further object is to provide a device of this character which will be simple and durable in construction and comparatively inexpensive to manufacture.

Other objects and advantages will be hereinafter referred to and more particularly pointed out in the claim.

In the accompanying drawings which are made a part of this application, Figure 1 is a plan view of a portion of a finger bar showing the cutter bar attached thereto and in position to begin its outward stroke. Fig. 2 is a detail sectional view taken in a line passng through a finger and its carrying bar. Fig. 3 is a top plan view of one of the fingers employed in connection with my improved cutting arrangement, and, Fig. 4 is a fragmentary view of Fig. 1, showing the position of the cutter bar at the completion of its outward stroke.

Referring to the drawings in which similar reference numerals designate corresponding parts throughout the several views, 1 indicates the bar of the mower or reaper, which has secured thereto at pre-determined intervals, fingers 2, said fingers being held in engagement with the bar in any preferred manner, as by means of bolts 3.

The fingers 2 have cut transversely therethrough openings 4, said openings being greater in depth adjacent the bar 1 to receive and form a passage for a cutter bar 5, said bar having secured thereto in the usual or any preferred manner, a plurality of blades 6, the edges of said blades beyond the bar 5, being preferably curved and brought to an edge to form a cutting surface for said blades, whereby grass, or the like, passing between the fingers, will be readily severed.

Fitting in the openings 4 and immediately below the extended portions of the blades 6, are plates 7, which plates are adapted to receive the wear caused by the blades traveling through the fingers and it will be readily seen that as the plates become worn, they can be renewed from time to time and thereby maintaining a perfect union between the blades and the walls of the openings.

The plates 7 are secured in position in the openings 4 by introducing a rivet 8 through the plate and the lower portion of the finger, and in order to readily place the rivet in position to hold the plate, that portion of the finger above the opening 4 is provided with a bore 9, through which the rivet is introduced into the opening through the plate and lower portion of the finger, the opening in the plate having a seat to receive the headed end of the rivet and after the rivet is properly seated, a tool may be introduced through the bore and into engagement with the headed end of the rivet and said rivet held firmly in place while the lower end thereof is being upset.

The bar 5 and blades secured thereto are operated in any desired manner, through the medium of a pitman 10 and the stroke of the pitman is such as to carry each blade through its respective finger and partially through the next adjacent finger, this movement being required to prevent clogging of the blades in the openings which frequently occurs in the present form of sickles, in view of the gum exuded from the grass, as it is being cut and by passing the blades entirely through their respective fingers, and partially through the adjacent fingers, this disadvantage is overcome.

In Fig. 1 of the drawing, the cutter bar is shown in position to make its outward stroke, while in Fig. 4 of the drawing, the same parts are shown after their outward stroke has been completed and by comparing the position of the parts in the two figures, it will be seen that each blade will travel entirely through its own respective finger and partially through the next adjacent finger, thus freeing the openings 4 from any obstruction and causing a free movement of the cutter bar and it will also be seen that by curving the cutting edges of the blades and making the extreme outer ends thereof slightly wider than the central portion of the blade, the grass will be gathered and more readily severed as the blades are moved back and forth and if preferred, the cutting edges may be milled or bearded as is the common practice.

That portion of the bar 5 to which the pitman 10 is secured, is provided with a head plate 11, the forward and rear edges of which pass below the retaining plates 12 and 13, respectively, said plates forming guides for the head and firmly holding the same in alinement with the sickle bar and in order to properly lubricate the wearing portions of the head plate, grease cups 14 are formed upon the plates 12 and 13, in which is adapted to be placed any suitable form of soluble lubricant, such as beeswax or the like and as the lower ends of the grease cups are in communication with the portion of the head plate extending below the ribs 12 and 13, the heat caused by the friction of the head plate against the ribs, will serve to slightly melt the lubricant and cause it to properly lubricate the bearing portions of the head plate.

It will thus be seen that I have provided a very cheap and economical form of cutting device for mowers and reapers and one that can be used in connection with the usual or any preferred form of machine and it will likewise be seen that by providing the extreme movement of the cutting blades and forming the cutting edges thereof in the manner shown, the grasses will be thoroughly and positively severed and the gumming or choking of the openings in the fingers, through which the blades pass, prevented.

What I claim is:

A cutting device of the character described, comprising a finger-bar, whose fingers have openings extending laterally therethrough and a wearing plate fixed thereto, in said openings, a cutter-bar slidable through said openings and equipped with blades having concave cutting edges, and means for moving said cutter-bar longitudinally as set forth.

In testimony whereof I have signed my name to this specification in the presence of two subscribing witnesses.

SAMUEL PIERSON.

Witnesses:
J. E. PEOPLES,
G. M. LISK.